Nov. 17, 1959 J. P. GLASBY, JR., ET AL 2,913,120
VACUUM OPERATED APPARATUS FOR MOVING FLUID MATERIAL
Filed March 26, 1957 3 Sheets-Sheet 1

INVENTORS
Jonathan P. Glasby, jr.
Lubin Palmer, jr.
BY Frank P. Pendleton
Ernest A. Jensen
ATTORNEY Nov. 17, 1959   J. P. GLASBY, JR., ET AL   2,913,120
VACUUM OPERATED APPARATUS FOR MOVING FLUID MATERIAL
Filed March 26, 1957   3 Sheets-Sheet 2
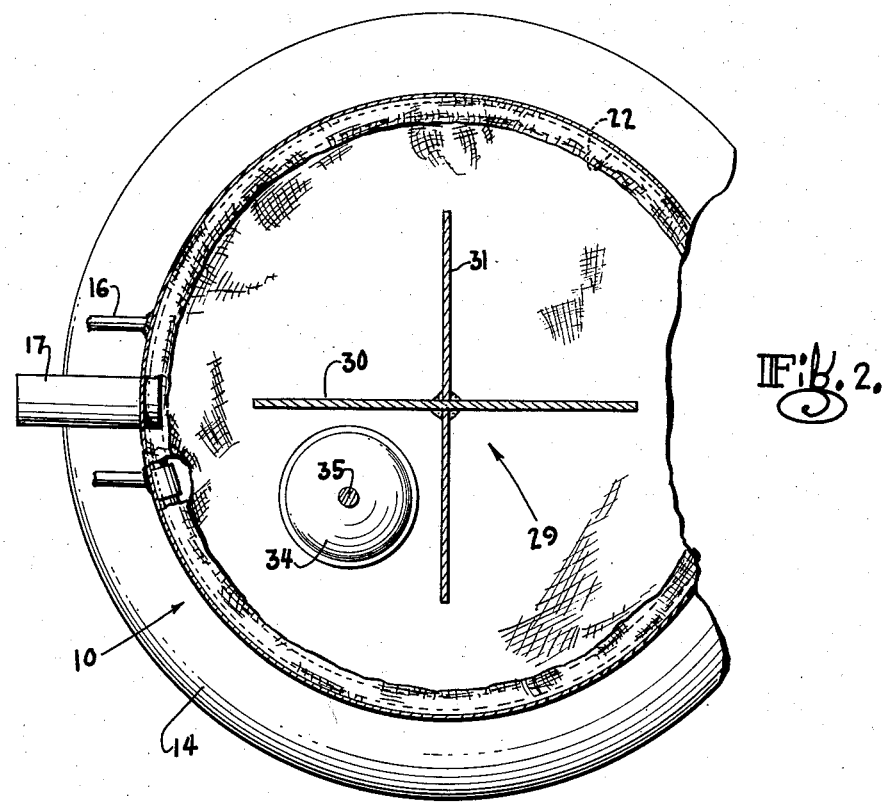
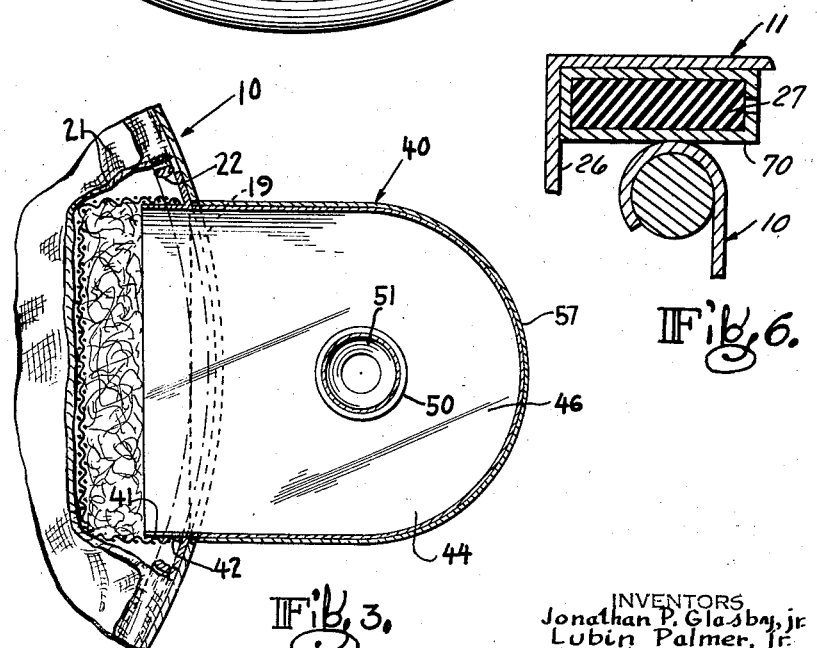
INVENTORS
Jonathan P. Glasby, jr.
Lubin Palmer, jr.
BY Frank P. Pendleton
ATTORNEY INVENTORS
Jonathan P. Glasby, Jr.
Lubin Palmer, Jr.
BY Frank P. Pendleton

ATTORNEY

United States Patent Office 2,913,120
Patented Nov. 17, 1959

2,913,120

VACUUM OPERATED APPARATUS FOR MOVING FLUID MATERIAL

Jonathan P. Glasby, Jr., Verona, Lubin Palmer, Jr., Upper Montclair, and Frank P. Pendleton, Montclair, N.J., assignors to J. P. Glasby Manufacturing Co., Inc., Belleville, N.J., a corporation of New Jersey Application March 26, 1957, Serial No. 648,556

5 Claims. (Cl. 210—416)

The present invention relates to apparatus for moving fluid material by suction, and, more particularly, to such apparatus which employs the venturi principle disclosed in United States Patent No. 2,863,525, issued December 9, 1958.

Accordingly, an object of the present invention is to provide an improved venturi vacuum producing unit which is adapted for attachment to the side wall or the cover of a receptacle at the exterior thereof.

Another object is to provide such a unit wherein a filter is removably supported at the interior of the receptacle.

Another object is to provide such a filter which is positioned whereby it will not interfere with a solids collecting bag supported within the receptacle.

Another object is to provide improved means for supporting such a bag.

Another object is to provide baffle means for deflecting the moved material away from the filter.

Another object is to provide means for indicating when the receptacle has been filled to a desired level.

Another object is to provide a cover for the receptacle which will seal the same even if the rim of the receptacle is out-of-round.

A further object is to accomplish the foregoing in a simple, practical and economical manner.

Other and further objects of the invention will be obvious upon an understanding of the illustrative embodiment about to be described, or will be indicated in the appended claims, and various advantages not referred to herein will occur to one skilled in the art upon employment of the invention in practice.

In the drawings:

Fig. 2 is a sectional view taken along the line 2—2 on Fig. 1.

Fig. 3 is a sectional view taken along the line 3—3 on Fig. 1.

Fig. 6 is an enlarged sectional view of a portion of the apparatus shown in Fig. 5.

Figure 1:
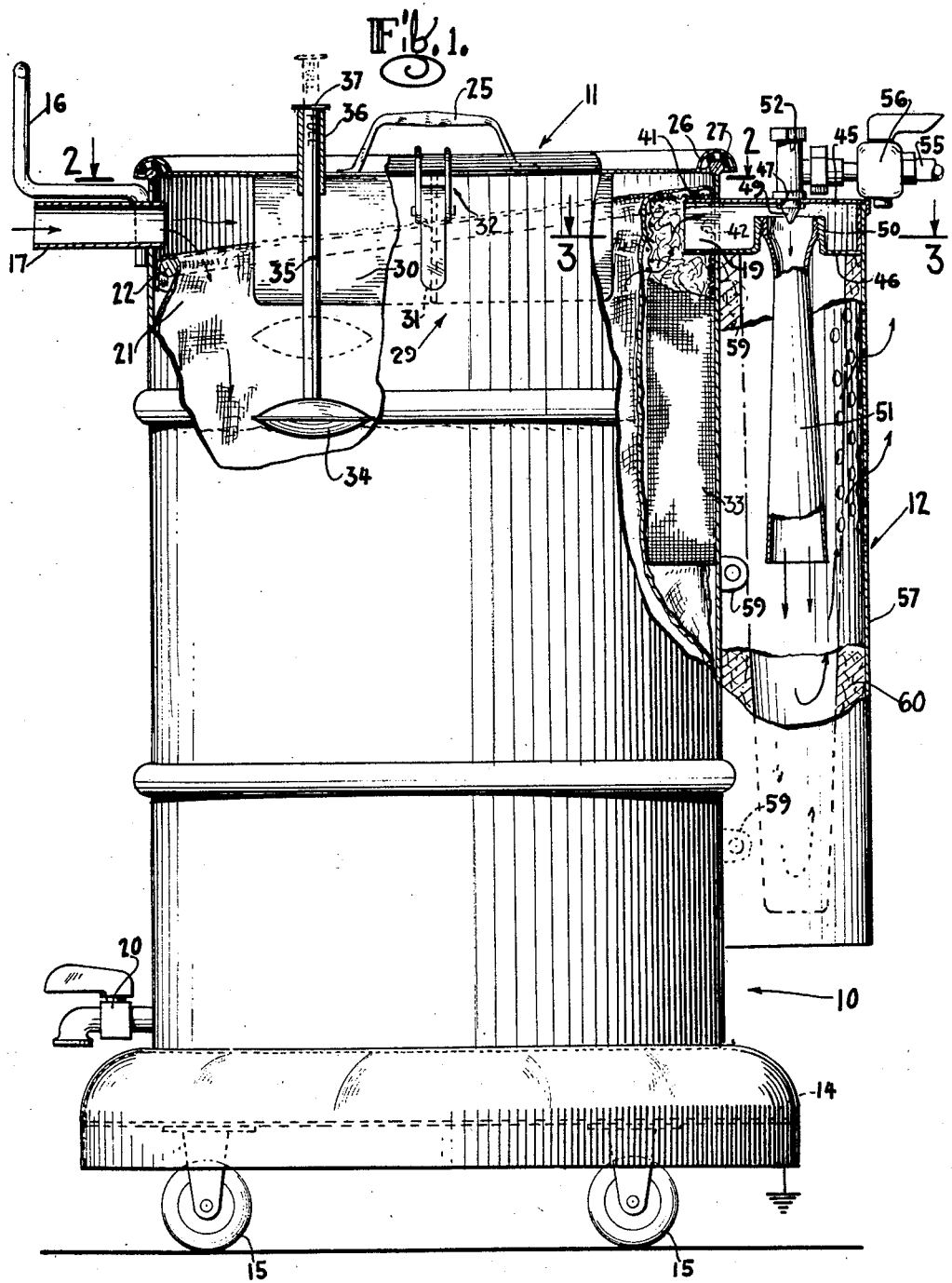
Fig. 1 is an elevational view, partly in section, illustrating one embodiment of apparatus in accordance with the present invention.

Referring to Figs. 1 to 3 of the drawings in detail, apparatus for moving and collecting fluid material is shown which generally comprises a receptacle 10, a cover 11 for the receptacle, and a suction or vacuum producing unit 12 mounted on the side wall of the receptacle.

The receptacle 10 may be a conventional drum which is mounted on a base 14 provided with rollers 15 to facilitate moving the receptacle on a floor surface during use thereof. A bracket 16 is secured to the receptacle adjacent the upper end thereof which serves as a handle for moving the recepatcle about and also serves as a support for hanging a coiled length of hose equipped with a pick-up attachment (not shown) adapted for connection to an inlet tube 17 of the receptacle located just below the bracket. The receptacle has an outlet opening 19 substantially diametrically opposite the inlet tube which is in fluid flow communication with the vacuum producing unit.

If desired, the receptacle may be provided with a drain cock 20 at the lower end thereof which is particularly useful where the apparatus is utilized to remove a mixture of solid and liquid material, for example, oil soaked chips of metals from the trough of a metal working machine. In this manner, the liquid can be drained from the receptacle and recovered and the chips can be sold as liquid free scrap.

Since the apparatus in accordance with this embodiment of the invention is primarily designed to collect solid particles or mixtures of solid particles and liquid, a collection bag 21 is supported within the receptacle. This is accomplished in an improved manner by providing a ring 22 which is hinged to the inner wall of the receptacle (Fig. 2) below the inlet and to the side at a level just below the tube 17. The bag 21 extends through the ring and the upper portion thereof is folded over the ring and extends downwardly, whereby the ring is adapted to clamp the folded portion against the inner wall of the receptacle. Such a bag enables the collected liquid to seep therethrough.

In cases where particles such as removable, metallic chips are to be collected, a perforated basket, preferably lined with a bag is placed into the receptacle.

The outer side of the cover 11 has a handle 25 at the center thereof to facilitate placing the cover on the receptacle and removing the same therefrom. The outer periphery of the cover has a recess 26 at the underside thereof in which a gasket 27 is mounted for sealing the receptacle at the rim thereof.

In order to deflect fluid material entering the inlet of the receptacle and preventing the same from being impinged on the outlet of the receptacle, a baffle 29 is secured to the underside of the cover. As shown in Figs. 1 and 2, the baffle comprises members 30 and 31 depending from the cover and extending at right angles with respect to each other. These members extend well below the receptacle inlet and outlet.

Preferably, the receptacle has two or more hasps 32 for removably securing the cover onto the receptacle to cause the gasket 27 to securely seal the receptacle.

Preferably, the apparatus is grounded to get rid of electrostatic charges created by the aspirator 12. This may be accomplished by attaching a wire or chain to the base 14 which is connected to ground.

Since overfilling of the receptacle 10 would cause collected liquid material to rise to the level of the outlet 19 and enter the suction producing unit 12, it is desired that the vacuumizing unit 12 be shut off before such a condition can occur. The present invention, accordingly, provides a warning device which indicates that the receptacle has been filled to a desired level. Such a device, as illustrated in Fig. 1, may comprise a float 34, a stem 35 attached to the upper end of the float, and a sleeve 36 extending through the cover 11 for slidably mounting the upper end of the stem, the stem having a flange 37 at its upper end which overlies the sleeve to normally suspend the float within the receptacle at a desired level.

As the receptacle is nearly filled, the collected material contained therein causes the float 34 to rise whereby the upper end of the stem 35 is exposed above the sleeve 36 to indicate that the bag is nearly filled. Suitable legend, such as "full," may be provided on the upper end of the stem, which, when fully exposed, indicates that the vacuumizing unit must be shut off.

One of the advantageous features of the vacuumizing unit 12 is the manner in which the same is attached to the receptacle at the outlet opening 19. This is accomplished by providing a box-like structure 40 which comprises a tubular end section 41 surrounded by an arcuate flange 42 fitted and suitably secured on the inner wall of the receptacle, for example, by welding the same, and a body section 44 extending through the outlet opening of the receptacle and being positioned exteriorly of the receptacle. In the illustrative embodiment disclosed herein, the outlet opening 19 and the tubular section 41 are rectangular, whereby the section 41 has parallel side walls and horizontal top and bottom walls.

The body section 44 includes a top 45, parallel side walls and a bottom 46 which are in alignment with the top side and bottom walls of the tubular section, and include an outer end wall facing the outlet opening 19 and the passageway provided by the tubular section from the body into the receptacle. The top 45 has an aperture 47 into which a nozzle 49 extends, and the bottom 46 has an interiorly threaded, upwardly projecting tubular section 50 into which the inlet portion of a venturi tube 51 is secured. The nozzle and venturi tube are concentrically arranged, and the upper end of the venturi inlet portion is spaced from the underside of the top to enable air to be drawn into the venturi tube from the receptacle by means of the box-like structure.

The nozzle 49 preferably is mounted on the top 45 by a fitting 52 secured to the cover and having the nozzle threadedly secured therein. The nozzle may be of the conventional variable orifice type. The fitting has a conduit 55 connected thereto for supplying compressed air to the nozzle from a suitable source (not shown). A shut-off valve 56 is provided in the conduit.

In order to baffle the air leaving the outlet of the venturi tube, a perforated casing 57 formed with a closed lower end has its upper end secured about the side and end walls of the body section 44 of the box-like structure, and has its sides secured to the receptacle at 59. The inner wall of the casing 57 is lined with a material, such as fiber glass, or a cylinder 60 closed at its lower end and formed of such material surrounds the venturi tube, which is effective to muffle the roar of the air leaving the venturi tube.

In order to prevent contamination of the venturi tube and the interior of the box-like structure, a filter unit 33 is mounted in the receptacle in front of the passageway leading to the venturi inlet. As shown herein (Figs. 1 and 3), the filter unit is generally rectangular and is so dimensioned that the walls of the tubular section 41 extend into the upper end thereof, with the top and side walls of the filter unit being adapted for removable attachment to the respective walls of the tubular section.

As shown, the portion of the ring about opposite its hinge rests on the upper end of the filter unit.

It will thus be apparent that the box-like structure serves a multi-fold purpose. For example, it provides a convenient connection between the receptacle and the venturi tube, and it serves as a support for the filter, the nozzle, the venturi tube and the casing or shield for the venturi tube.

Figure 4:
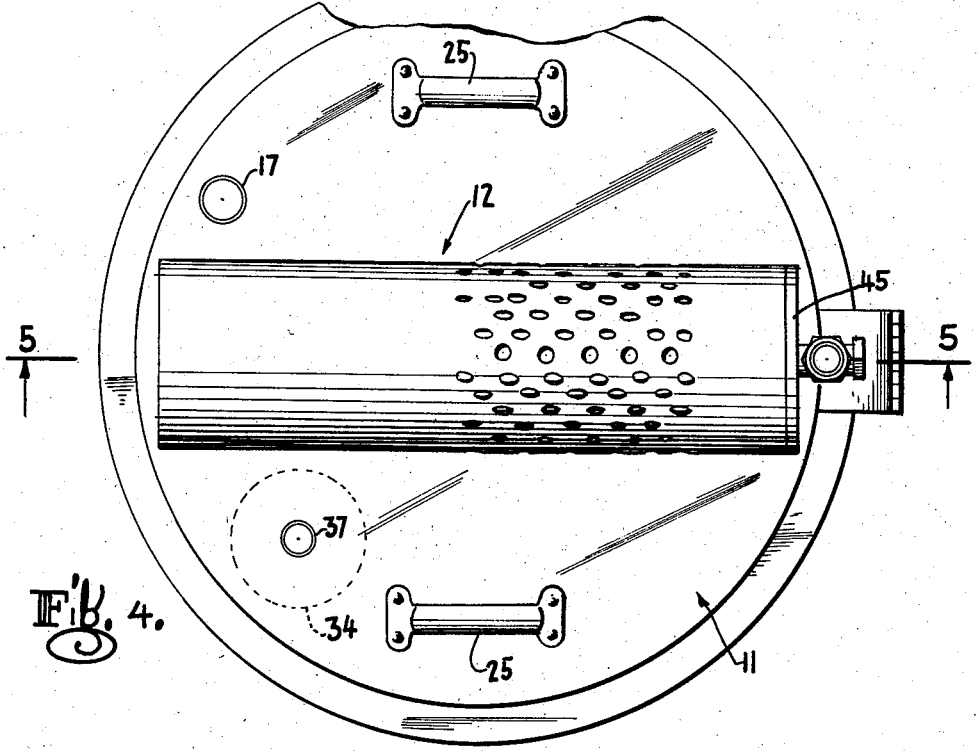
Fig. 4 is a fragmentary plan view of another embodiment of apparatus in accordance with the present invention.
Figure 5:
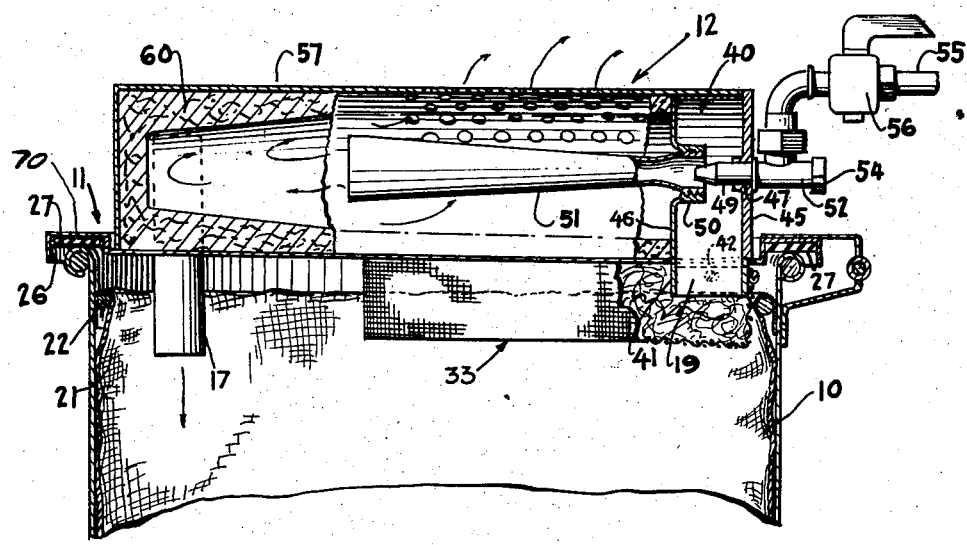
Fig. 5 is a fragmentary sectional view taken along the line 5—5 on Fig. 4.

In Figs. 4 and 5, another embodiment of the present invention is illustrated which differs from the embodiment previously described in that the vacuumizing unit 12 is mounted on the cover 11, and that the cover is provided with the inlet tube 17 and the outlet opening 19. The vacuumizing unit including the box-like structure which facilitates assembly of the various components thereof, the filter, the muffler and the venturi system and the float are essentially the same as previously described in connection with Figs. 1, 2 and 3, and like elements are indicated by like reference numerals.

An advantage of the arrangement shown in Figs. 4 and 5, is that the receptacle 10 may be a conventional drum upon which the cover unit is placed. In this manner, any number of drums may be filled and disposed of directly without emptying the receptacle into another receptacle for disposal.

Since the drums are used over and over, rough handling thereof may cause the rim thereof to get out-of-round. Thus, to guard against an imperfect seal between the cover and the rim, a gasket 27 is provided which has a radial dimension several times that of the rim (Fig. 5), thereby assuring a tight seal even when the rim is out-of-round.

Another advantage of this arrangement is that the cover unit is self sealing and hasps or the like are not required to secure the cover onto the receptacle. This is made possible because the combined weight of the cover and the vacuumizing unit is sufficient to hold the gasket 27 tightly against the rim, and when the unit is operated, the suction created within the receptacle further tends to pull the cover down towards the rim.

Also, the cover unit is more economical to manufacture because the prefabricated receptacle can be dispensed with. However, if desired, a drum having a wheeled base and means for supporting a bag 21 could be supplied with the cover unit.

Instead of using a bag, a chip basket lined with a bag could be utilized. Such a basket could be provided with a flange at its upper end adapted to be supported on the web of an angle ring secured within the drum below its upper end. Also, the cover could be hinged to the drum as shown in Fig. 5.

In order to ground the cover on which the aspirator is mounted through the drum or its base 14 as previously indicated, a conductive strip 70 or wire (Fig. 6) is secured in electrical connection to the underside of the cover and is folded over the gasket 27 to place the same in electrical connection with the rim of the drum.

An advantage of the present invention, is that the same parts can be used in producing either the apparatus having the unit 12 at the side of the receptacle (Figs. 1 to 3) or the apparatus having the unit 12 on the cover (Figs. 4 and 5). The only change that need be made is that the flange 42 in latter instance is flat to fit the cover instead of arcuate to fit the receptacle side wall. Thus, both types of apparatus can be produced with manufacturing economy.

From the foregoing description, it will be seen that the present invention provides improved vacuum operated apparatus for moving fluid material and disposing the same.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

We claim:

1. In a vacuum operated apparatus of the class described, the combination of a container including a drum member and a cover member, one of said container members having an inlet opening and an outlet opening spaced apart from each other; suction producing means operatively connected to said outlet opening; a ring member; and a hinge for mounting said ring member on the inner wall of said drum member adjacent its upper end, said ring member being constructed and arranged to be rotated about its hinge into one position for clamping the open end of a fabric bag against said inner wall to suspend the same within said drum member and to be rotated to another position for releasing the bag.

2. In a vacuum operated apparatus of the class described, the combination of a container including a drum member and a cover member, one of said container members having an inlet opening and an outlet opening spaced apart from each other; suction producing means operatively connected to said outlet opening; a ring-like member hinged on the inner wall of said drum member adjacent its upper end for supporting the open end of a fabric bag to suspend the same within said drum member; and a baffle on said cover member between said inlet and outlet openings and adapted to extend into said bag.

3. In a vacuum operated apparatus of the class described, the combination of a container including a drum member and a cover member, one of said container members having an inlet opening and an outlet opening spaced apart from each other; suction producing means operatively connected to said outlet opening; a ring member; a hinge for mounting said ring member on the inner wall of said drum member adjacent its upper end, said ring being constructed and arranged to be rotated into one position for clamping the open end of a fabric bag against said inner wall to suspend the same within said drum member and to be rotated to another position for releasing the bag; and drainage valve means secured to the lower end of said drum member.

4. In vacuum operated apparatus, the combination of a container having an open top provided with a rim, a cover for said container having an inlet opening adjacent its periphery and having an outlet opening adjacent its periphery substantially diametrically opposite said inlet opening, an ejector pump mounted on the top of said cover extending radially across said cover to distribute its weight along the diameter thereof and comprising a venturi, means providing a confined fluid flow passage between the inlet of said venturi and said cover outlet opening, a nozzle for directing compressed gas into the inlet of said venturi, and an annular gasket positioned adjacent the outer periphery of said cover at the underside thereof, said cover having a greater radial dimension than said rim, and said gasket having an outer radial dimension greater than the radial dimension of said rim and an inner radial dimension less than the radial dimension of said rim, whereby the combined weight of said cover and said pump effects a seal between said cover and said rim which is unaffected by a degree of radial deformation of said rim.

5. Apparatus according to claim 4, including an electrically conductive member folded over said gasket and extending from the upper surface of said gasket to the lower surface thereof to place said cover in electrical communication with said rim.

References Cited in the file of this patent

UNITED STATES PATENTS

| | | |
|---|---|---|
| 293,335 | Knapp | Feb. 12, 1884 |
| 329,064 | Moore | Oct. 27, 1885 |
| 723,091 | Webb et al. | Mar. 17, 1903 |
| 1,083,408 | Matchette | Jan. 6, 1914 |
| 1,115,505 | Chapin | Nov. 3, 1914 |
| 1,138,125 | Leblanc | May 4, 1915 |
| 1,695,542 | Eisenhauer | Dec. 18, 1928 |
| 1,976,439 | Dotterweich | Oct. 9, 1934 |
| 2,085,361 | Hellmer | June 29, 1937 |
| 2,223,242 | Sweet | Nov. 26, 1940 |
| 2,465,623 | Zika | Mar. 29, 1949 |

FOREIGN PATENTS

| | | |
|---|---|---|
| 823,781 | Germany | Dec. 6, 1951 |